United States Patent [19]

Mitterer

[11] 4,070,607
[45] Jan. 24, 1977

[54] DRIVE CIRCUIT FOR POWER OPERATION OF A MOVABLE PART OF A VEHICLE COACHWORK

[75] Inventor: Erik Mitterer, Stockdorf, Germany

[73] Assignee: Webasto-Werk W. Baier GmbH & Co., Germany

[21] Appl. No.: 626,755

[22] Filed: Oct. 29, 1975

[30] Foreign Application Priority Data

Nov. 19, 1974 Germany .............................. 2454723

[51] Int. Cl.² .......................... G05D 3/00; H02P 1/04; H02P 3/00
[52] U.S. Cl. .................................... 318/468; 318/265; 318/282
[58] Field of Search ............... 318/265, 282, 466, 467, 318/468

[56] References Cited

U.S. PATENT DOCUMENTS

| 2,405,628 | 8/1946 | Yardeny | 318/466 |
| 2,695,382 | 11/1954 | Wheatley et al. | 318/468 |
| 2,991,403 | 7/1961 | Groft | 318/467 |
| 3,508,133 | 4/1970 | Schneider et al. | 318/466 |

Primary Examiner—Robert K. Schaefer
Assistant Examiner—Eugene S. Indyk
Attorney, Agent, or Firm—Craig & Antonelli

[57] ABSTRACT

A control device for a motor-driven closure panel, for instance an automobile sunroof panel whose closed position is an intermediate position between an open, retracted position and another open, pivoted position, the circuitry for the reversible motor including an impulse relay operating a control switch in one of the two motor connections, the relay coil being connected in parallel to the motor and between the control switch and the pole reversing switch, a position-responsive switch cutting off the relay circuit whenever the panel moves out of its closed position and energizing the impulse relay whenever the panel reaches the closed position. An improved switch arrangement prevents the panel from being stuck in a position in which the reversible motor becomes inoperative.

2 Claims, 5 Drawing Figures

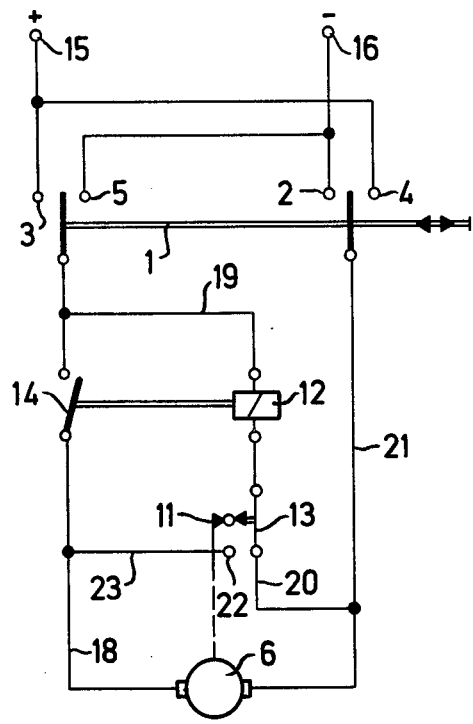
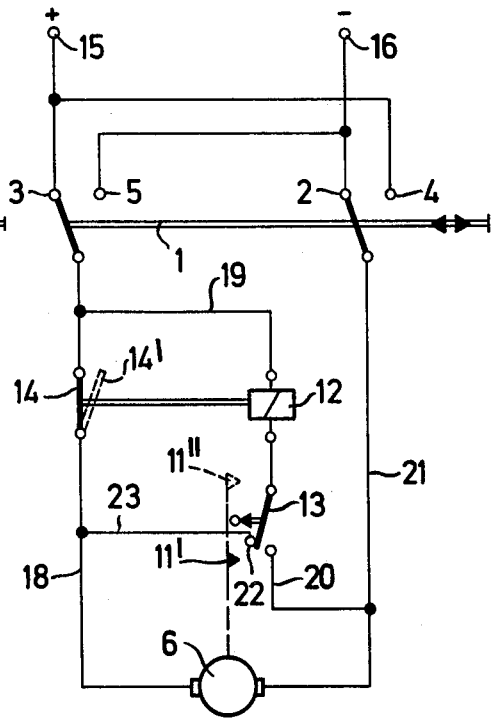
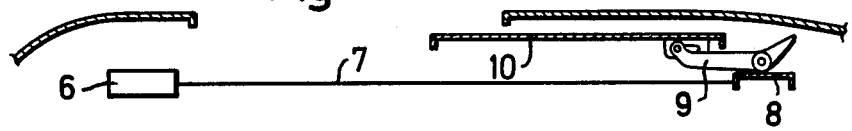
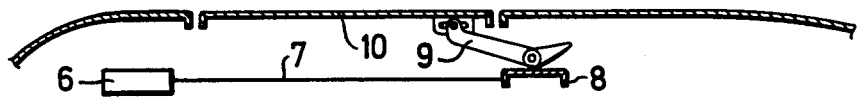
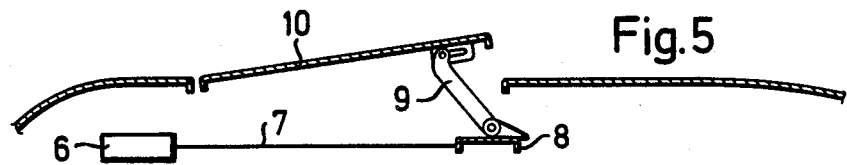

DRIVE CIRCUIT FOR POWER OPERATION OF A MOVABLE PART OF A VEHICLE COACHWORK

BACKGROUND OF THE INVENTION

1. Field of the invention

This invention relates to control devices for electromechanically operated closure panels and the like, and more especially to actuating devices for sliding panels for the purpose of closing apertures, e.g. windows, doors, or roof openings, such as sliding roofs of vehicles, in which a reversible motor drives the movable parts by way of transmission elements.

2. Description of the Prior Art

U.S. Pat. No. 1,345,197 discloses a drive circuit for power operation of a movable part of a vehicle coachwork comprising a reversible motor supplied with current through a pole reversal switch and provided in the motor power supply circuit with switch means actuably by an impulse relay to which impulses are supplied through further (i.e. "second") switch means actuated by a control member movable by said motor when said control member reaches a prearranged position in its path of movement, said impulse relay being in parallel with said motor, and said relay controlled (i.e. "first") switch means being connected between one side of said impulse relay and one side of said motor.

This patent also discloses an actuating device for a movable part of a vehicle coachwork for the purpose of opening and closing apertures, which is provided with a motor which drives the movable part through transmission elements, a pole reversal switch for connecting terminals of the motor to different poles of a current source as required, an impulse relay, the control winding of which is connected in parallel with the motor, the relay (i.e. "first") switch being situated in a power supply lead to the motor and between the motor and the impulse relay, and a "second" switch for operating the impulse relay in one of the leads connecting the control winding of the impulse relay to a connecting lead between the motor and the pole reversal switch, the second switch being actuated by a control device driven by the motor which keeps the said switch closed while the movable coachwork part is in the closed position but open during the opening and closing of said part.

If a raisable sliding roof for a vehicle equipped with an operating mechanism according to the said Patent is raised or lowered into the closed position from a raised or retracted position by operating the pole reversal switch, it is possible, due to maladjustment or a high battery voltage, for the centrifugal force of the motor or roof to raise or lower the roof beyond the closed position. The second switch, operated via the control mechanism driven by the motor, is firstly closed in the closed position of the roof so that the impulse relay is operated and the first switch opened and then, through the further movement of the roof beyond the closed position, is opened again. As in this state both the first and second switches are open, the control winding of the impulse relay can receive no further pulse even if the pole reversal switch is operated again, so that the first switch cannot be closed and the motor cannot be supplied with power.

SUMMARY OF THE INVENTION

The problem which the invention seeks to overcome is to so improve the operating mechanism according to the said Patent that the above-described situation cannot occur, enabling the control winding of the impulse relay to receive a pulse even when the second switch is open.

According to the invention, the second switch has an additional contact which with the second switch when open connects the appropriate terminal of the control winding with the lead connecting the motor and the first switch. If the above-described case now occurs, whereby the second switch is opened by overtravelling the closed position on operating the pole reversal switch, the control winding of the impulse relay can now receive a pulse via the electric motor winding which closes the first switch and supplies power to the electric motor. This function is ensured due to the fact that the motor winding has a much lower resistance than the control winding of the impulse relay.

The remaining function of the operating mechanism according to U.S. Pat. No. 1,345,197 is not affected by the proposal according to the present invention.

BRIEF DESCRIPTION OF THE DRAWINGS

The following is a description by way of example only and with reference to the drawings of a preferred embodiment of the present invention.

FIG. 1 is a circuit diagram with the movable component in the closed position.

FIG. 2 is a circuit diagram of FIG. 1 but with the movable component in the open position.

FIG. 3 is a diagrammatic side view of a raisable sliding roof for a vehicle in the open position.

FIG. 4 is a view of the roof of FIG. 3 in the closed position.

FIG. 5 is a view of the roof of FIG. 3 in a raised position.

A pole reversal switch 1 is automatically reset to the isolated position shown in FIG. 1 by a spring mechanism (not shown) and can be operated by pushing to connect contacts 2, 3 (see FIG. 2) and by pulling to connect contacts 4, 5. Contacts 3 and 4 are connected with a positive pole 15 and contacts 2 and 5 are connected with a negative pole 16 of a power source. The wipers of pole reversal switch 1 are connected with the terminals of an electric motor 6 by a first connecting lead 18 and a second connecting lead 21. Thus, depending on the operating direction of pole reversal switch 1, motor 6 can be operated in one or other rotation sense, whereby in the case of FIGS. 3 to 5 it either raises or retracts a roof sliding 10 panel from a roof opening by means of a cable 7, which is rigid in compression, a transport bridge 8 and a lever member 9. A first switch 14, operated by an impulse relay 12 is arranged in the first connecting lead 18. The control winding of impulse relay 12 is on the one hand connected with the first connecting lead 18 between the first switch 14 and the pole reversal switch 1 by a lead 19 and on the other with the second connecting lead 21 via a lead 20. A second switch 13, operated by a control element 11 is provided in the lead 20. Control element 11 is moved by motor 6 in one rotational sense into the position 11' indicated in FIG. 2 and in the other rotational sense into the position 11'', indicated by dotted lines in FIG. 2.

If the pole reversal switch 1 is switched from the closed position of the sliding roof 10 shown in FIGS. 1 and 4 to connect contacts 2 and 3, firstly the impulse relay 12 receives power via the closed switch 13, so that switch 14 is closed and the motor 6 is connected with the poles 15, 16 of the power source. Roof 10 is lowered by running motor 6 and moved into the open position shown in FIG. 3. Simultaneously control element 11 is moved into position 11', so that switch 13 is opened. The end of the opening movement is brought about by releasing the pole reversal switch 1 or by reaching a stop member (not shown), in which case, until the motor is switched off by the impulse release, a friction coupling prevents the stalling of motor 6.

If roof 10 is now to be moved from the open position back into the closed position, the pole reversal switch 1 is switched to connect contacts 4 and 5, whereby motor 6 immediately receives power through the still closed switch 14, but this now takes place in the other rotation sense because the polarity has been reversed. On reaching the closed position of roof 10, switch 13 is closed by control element 11, which during the closing movement moves back from its position 11' into its position 11 shown in FIG. 1. As a result, impulse relay 12, which only responds to current surges, receives power, so that control switch 14 is opened and therefore motor 6 is automatically switched off.

If the pole reversal switch 1 is now released and is then again switched to connect contacts 4 and 5, impulse relay 12 receives power via the closed switch 13, whereby switch 14 is closed and motor 6 switched on, so that roof 10 is raised as shown in FIG. 5, because transport bridge 8 is moved on in the same direction as during the closing movement from the open position. However, control element 11 moves into position 11". The end of the raising movement, as during the opening movement, is reached on releasing the pole reversal switch 1 or on reaching a stop member (not shown).

To move roof 10 back from the raised position into the closed position, pole reversal switch 1 is switched to connect contacts 2 and 3. Motor 6 immediately receives power via the closed switch 14, roof 10 is moved into its closed position as shown in FIG. 4, the control element is moved back from its position 11" into position 11 as shown in FIG. 1. As described with reference to the closing process from the open position, the motor 6 is automatically switched off by closing switch 13.

In the apparatus so far described above, which in all points corresponds to the apparatus of the U.S. Pat. No. 1,345,197, it can occur through maladjustment or by a high battery voltage that the centrifugal force of the motor 6 on the roof 10 lowers or raises said roof 10 by a small amount over and beyond the closed position shown in FIG. 4 on closing from a retracted position as shown in FIG. 3 or from a raised position according to FIG. 5. As a result switch 13 is closed as shown in FIG. 1 at the movement when the closed position is reached (as a result of which impulse relay 12 is operated and switch 14 is opened), but is opened again in the next moment. The impulse relay 12 can now receive no further power and the whole apparatus is rendered inoperative. According to the invention, to prevent this, the second switch 13 is provided with an additional contact 22 which, with switch 13 in the open position, connects the associated terminal of the control winding of impulse relay 12 with the first connecting lead 18 between the terminal of motor 6 and the first switch 14. If the above-described case now occurs in which switch 13 is open and switch 14 has also reached the open position 14' shown by dotted lines in FIG. 2, with the pole reversal switch operated, impulse relay 12 can receive power via the second connecting lead 21, the winding of motor 6, lead 23 and contact 22. As a result switch 14 is closed and motor 6 is connected to the power source. This closing of switch 14 has no influence on impulse relay 12 because then its two terminals are connected to the same pole 15 of the power source. Therefore, due to the running motor 6, roof 10 is, in the manner described hereinbefore and depending on the motor rotational sense, moved in one or other direction, being raised or lowered until the pole reversal switch is released or a stop member is reached. In the manner described hereinbefore, when roof 10 is in the closed position switch 13 is closed, i.e. brought into the position shown in FIG. 1 so that impulse relay 12 receives a pulse and switch 14 opens. It is pointed out that the winding of motor 6 normally has a much lower resistance than the control winding of impulse relay 12. As a result the voltage drop via motor 6 does not impair the operation of impulse relay 12 when this receives power via line 23 and contact 22 with switch 13 open.

What we claim is:

1. In a control device for an electromechanically operated closure panel, for example, of the kind used in so-called power windows, power doors and power sunroofs of automobiles and the like, comprising in combination:

A. a reversible electric motor and power source therefor,
B. transmission means between the motor and the closure panel capable of moving the latter into and out of a closed position,
C. a pole reversing switch arranged between the power source and the connecting leads of the motor,
D. a relay having its winding connected in parallel with the motor between the motor connections and the reversing switch,
E. a control switch actuated by the relay and arranged to open and close one of the motor leads between the parallel connections of the relay winding and the motor,
F. a position-responsive switch arranged in one of the connections of the relay winding, and
G. means for actuating the position-responsive switch in response to the movement of the closure panel and its transmission means,
   the improvement wherein said position-responsive switch further comprises a contact arm connected to one end of said relay winding and two contacts, the first contact being connected to the motor lead which is directly connected to the reversing switch and the second contact being connected to the other motor lead, and
   wherein the position-responsive switch and the actuating means are so arranged that said contact arm assumes a first position when the panel is in its closed position, and a second position when the panel is in an open position, the contact arm cooperating in its first position with the first contact and in its second position with the second contact.

2. A control device according to claim 1, wherein the motor winding has a lower electrical resistance than the relay winding.

* * * * *